May 2, 1933.    A. J. DAVIS    1,906,548
BOTTLE WASHING APPARATUS
Filed April 16, 1930    4 Sheets-Sheet 1
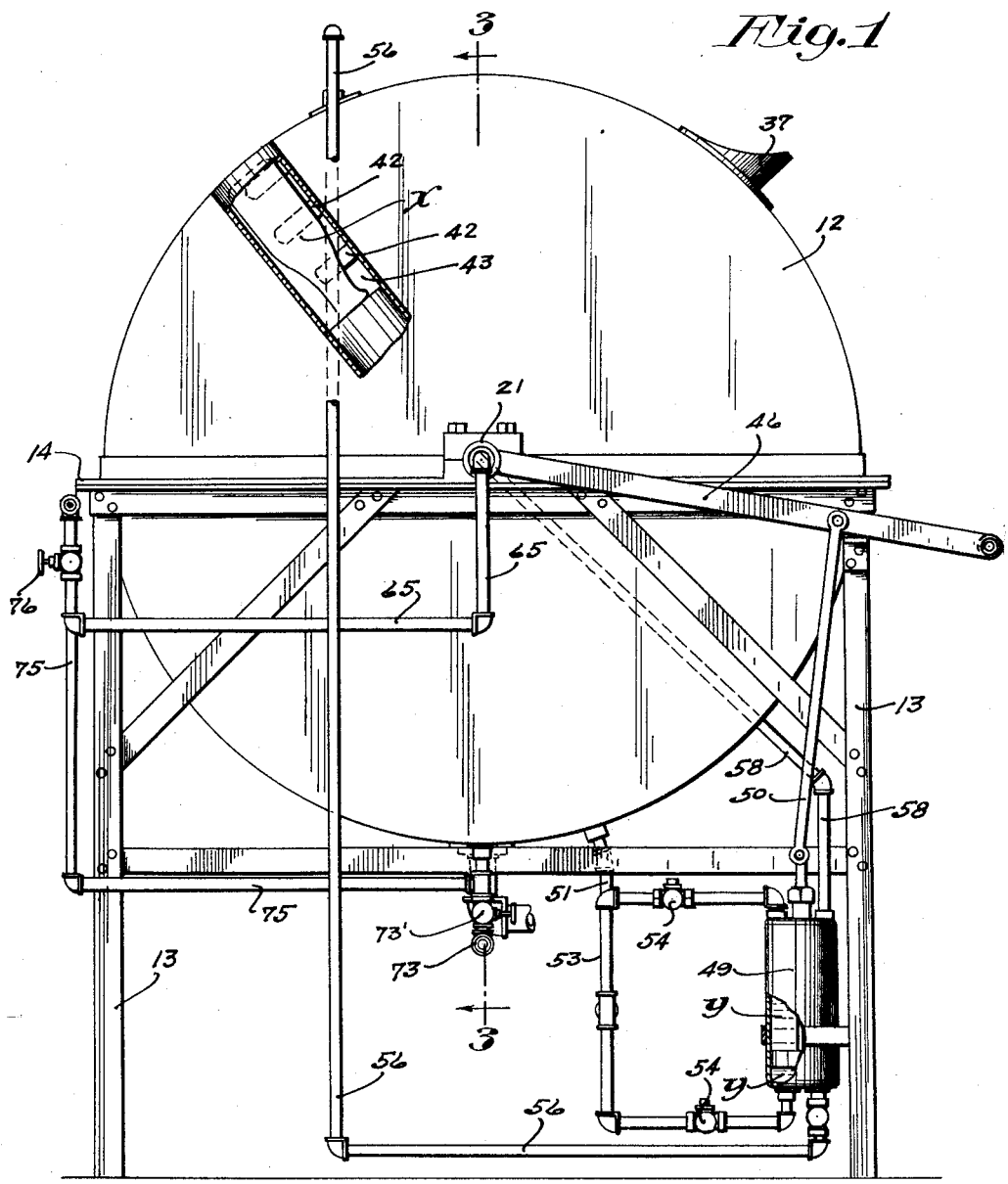
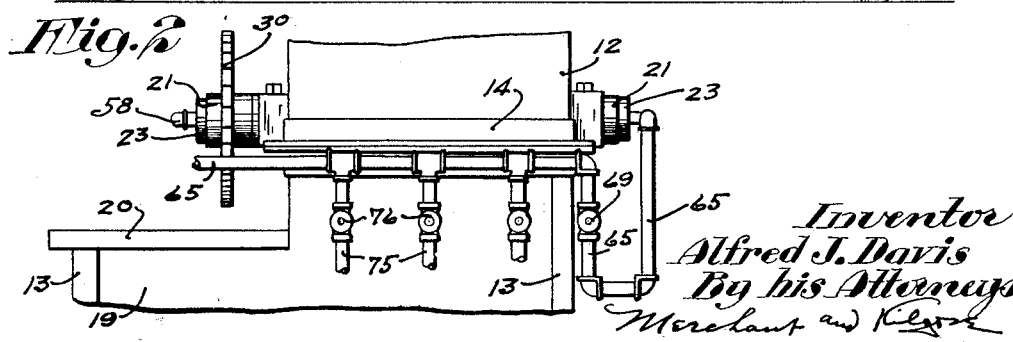

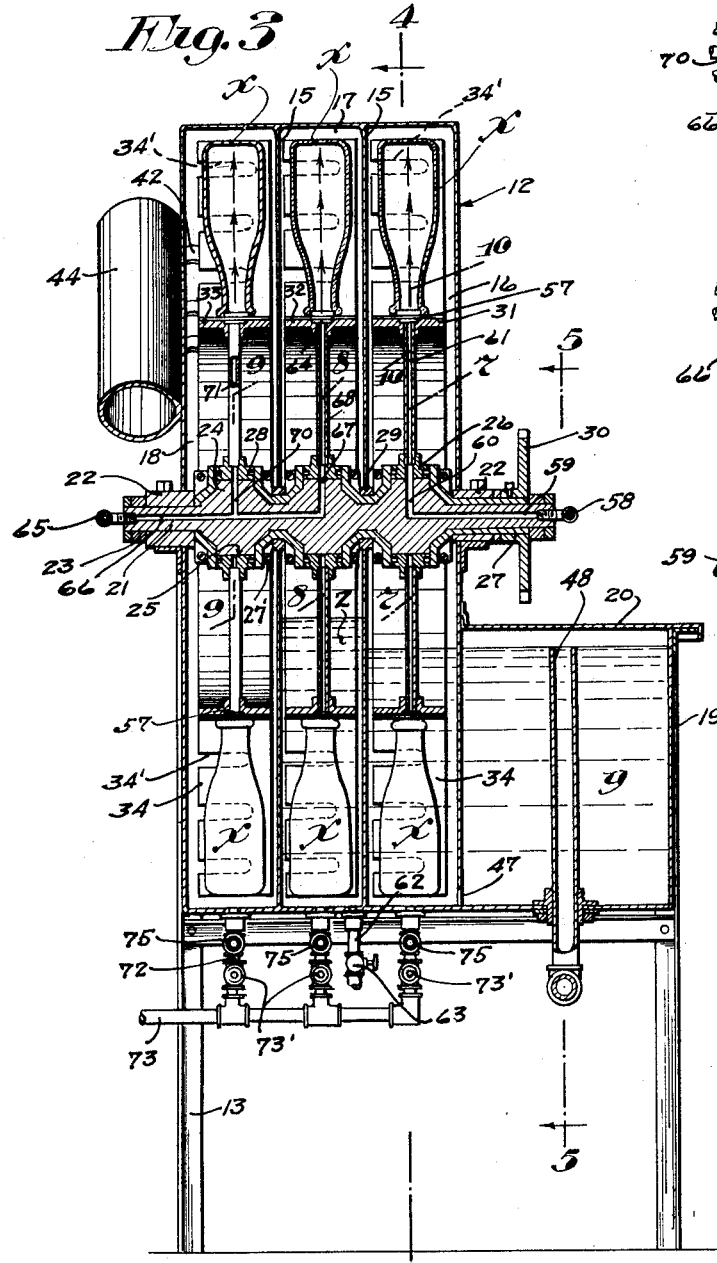

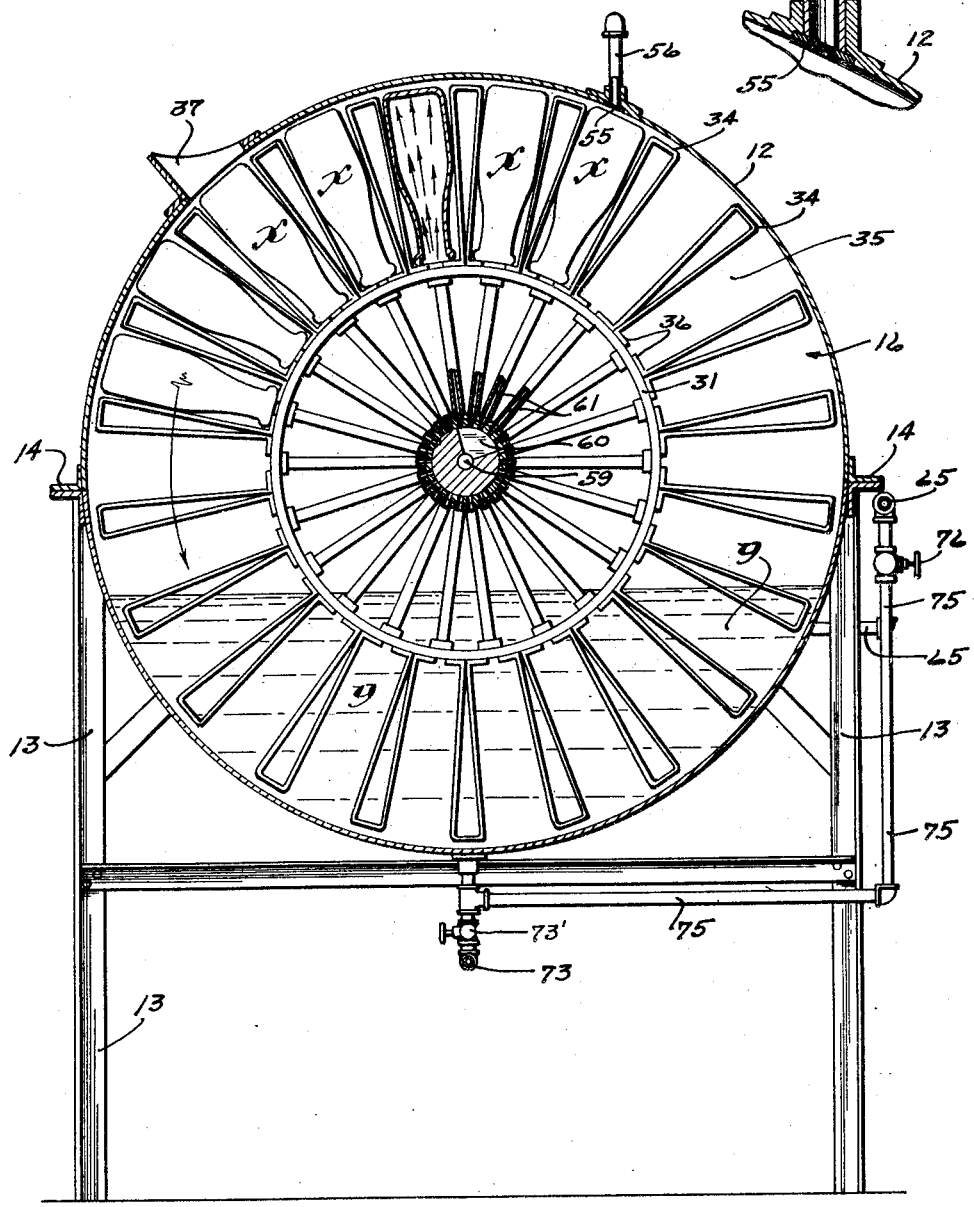

May 2, 1933.　　　A. J. DAVIS　　　1,906,548
BOTTLE WASHING APPARATUS
Filed April 16, 1930　　　4 Sheets-Sheet 4
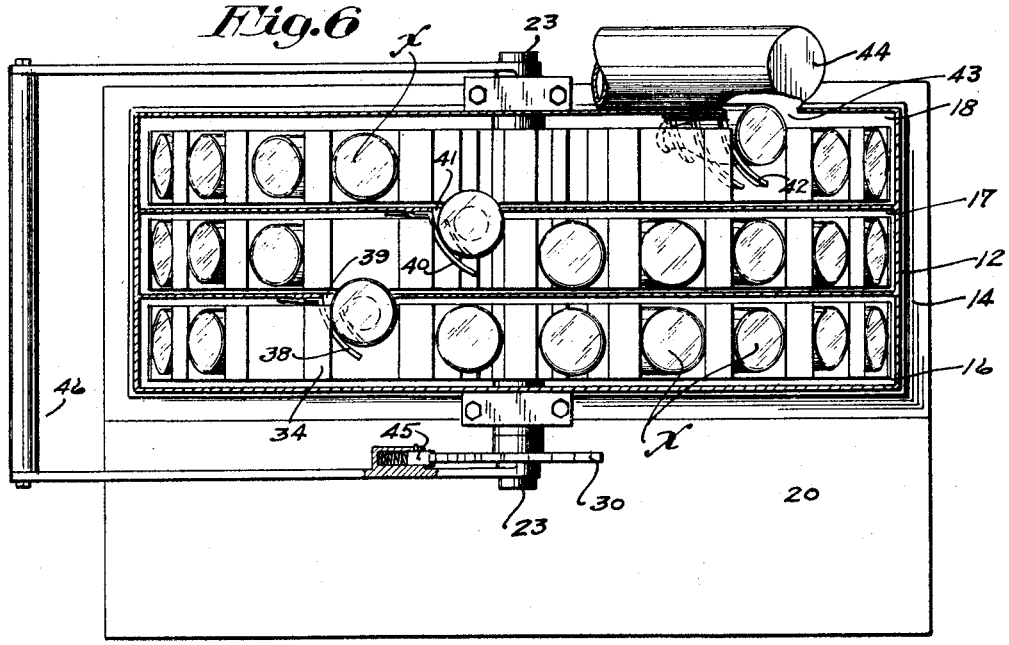
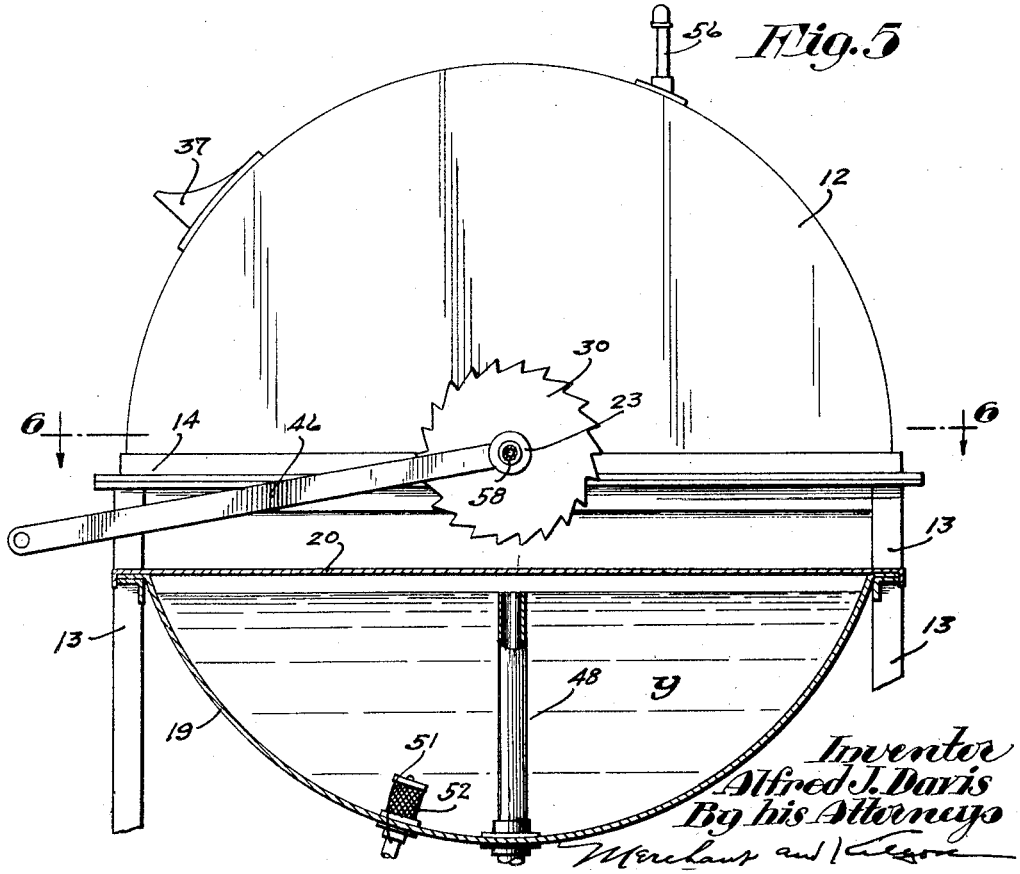

Patented May 2, 1933

1,906,548

UNITED STATES PATENT OFFICE

ALFRED J. DAVIS, OF MINNEAPOLIS, MINNESOTA

BOTTLE-WASHING APPARATUS

Application filed April 16, 1930. Serial No. 444,694.

My invention has for its object to provide a highly efficient washing apparatus intended for general use but especially well adapted for washing bottles and more particularly milk and cream bottles.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a left side elevation of the bottle washing apparatus, some parts being broken away and other parts being sectioned;

Fig. 2 is a fragmentary rear elevation;

Fig. 3 is a view principally in transverse vertical section taken on the line 3—3 of Fig. 1;

Fig. 4 is a view principally in vertical section taken on the line 4—4 of Fig. 3;

Fig. 5 is a view partly in right side elevation and partly in vertical section taken on the line 5—5 of Fig. 3;

Fig. 6 is a view partly in plan and partly in horizontal section taken substantially on the line 6—6 of Fig. 5;

Figs. 7, 8 and 9 are fragmentary detail views with some parts sectioned on the lines 7—7, 8—8 and 9—9, respectively, of Fig. 3;

Fig. 10 is a fragmentary detail view in section taken on the line 10—10 of Fig. 3, on an enlarged scale; and Fig. 11 is an enlarged sectional view of the external spraying nozzle.

The numeral 12 indicates a horizontally disposed cylindrical drum-like casing comprising upper and lower semi-cylindrical sections, the latter of which extends into a skeleton-like frame 13 from the top thereof and is rigidly held therein. The joint between the two sections of the casing 12 is at the axis thereof and top of the frame 13 and includes reinforcing angle irons 14 the horizontal flanges of which are turned outward and detachably connected by bolts.

Within the casing 12 are two laterally spaced partitions 15 which divide the casing into a washing compartment 16, at the right side thereof, a rinsing or intermediate compartment 17 and a sterilizing and drying compartment 18 at the left side thereof. On the right side of the lower section of the casing 12 and formed in part therewith is a reservoir 19, see Figs. 3 and 5, provided with a displaceable cover 20 having a capping flange which holds the same in position.

Extending transversely through the casing 12 at the axis thereof is a fixed inner shaft 21 the end portions of which are mounted in two-part bearings 22 on the lower section of the casing 12. The left hand bearing 22 is frictionally clamped on the respective end of the shaft 21 and holds the same from turning. Nuts 23 on the outer ends of the shaft 21 hold said shaft against end thrusts.

Formed with the shaft 21 in each compartment 16, 17 and 18 is a large annular boss 24 the periphery of which affords a valve seat 25 for a ring valve 26 turnably mounted thereon. A tubular shaft 27 is turnably mounted on the shaft 21 and the sides of its bosses 24. This tubular shaft 27 comprises axially spaced sections between which the ring valves 26 are mounted and connected thereto by pins 28 for common rotation therewith, see Fig. 3. The inner end of the tubular shaft 27 terminates at the inner face of the left hand bearing 22 and the outer end thereof is journaled in the respective bearing 22 and on the fixed shaft 21 and extends outward thereof to the adjacent lock nut 23.

The partitions 15 are provided with annular seats 29 in which the tubular shaft 27, between its bosses 24, is mounted with a turning fit and which seats form tight joints between said shaft and partitions.

Keyed to the tubular shaft 27 between the right hand bearing 22 and adjacent lock nut 23 is a relatively large ratchet wheel 30 for imparting steps of rotary movement to said shaft. The tubular shaft 27 is longitudinally divided for application around the fixed shaft 21 and the members thereof are detachably connected by ears and screws 27'.

The ring valves 26 afford hubs for wheel-like bottle carriers 31, 32 and 33 in the compartments 16, 17 and 18, respectively. Each bottle carrier in addition to its valve includes an annular rim and tubular radial spokes 33. Each bottle carrier further includes on its rim radially projecting transverse partitions 34 circumferentially spaced to form pockets 35 therebetween for individually holding milk bottles X.

Each partition 34 circumferentially of the bottle carried is U-shaped and its legs have on their ends outwardly and laterally projecting feet which rest on the periphery of the rim and are rigidly secured thereto. The legs of the partitions 34 at their feet are drawn together so that the sides of the adjacent pockets 35 are substantially parallel and snugly hold a bottle X therebetween and in axial alignment with the respective tubular spoke which affords a conduit, as will presently appear. Said partitions 34 are spaced from the casing 12 for free circulation of water, steam and air around the bottles X held therein during their movement through the apparatus.

It is important to note by reference to Fig. 4, that there is a pocket 35 for each spoke and that adjacent feet in each pocket are spaced endwise from each other to leave an open space therebetween. The two feet in each pocket 35 afford open seats 36 on which the tops of the bottles X rest and are held thereby out of contact with the rim of the bottle carrier to prevent the mouths of the bottles X from being closed.

The pockets 35 in the bottle carrier 31 during its rotation are successively brought into longitudinal alignment with an entrance passageway 37 in the casing 12 at the top thereof on the downwardly moving side of said bottle carrier, see Fig. 4. As the pockets 35 in the bottle carrier 31 are successively brought into registration with the entrance passageway 37 the operator inserts the bottles X therein, necks first, with their tops in engagement with the seats 36. This bottle carrier 31 moves the bottles X through a cleansing fluid Y in the compartment 16 and after passing through this fluid are inverted by said carrier which drains the cleansing fluid therefrom.

The arrangement of the pipes 56 and 58 is such that the cleansing fluid Y is delivered to the nozzle 55 during the down stroke of the pump piston and to the nozzle 57 when their intake conduits 61 are in registration with the port 60.

Just before the bottles X in the bottle carrier 31 have made a complete rotation in the washing compartment 16 from the entrance passageway 37 they successively engage a transfer device 38 and are moved laterally thereby through a passageway 39 in the right hand partition 15 and into the pockets 35 in the bottle carrier 32 in the rinsing compartment 17. This transfer device 38, as shown, comprises three radially spaced curved fingers secured to the right hand partition 15 at the passageway 39. Two of these fingers of the transfer device 38 are shaped to engage the body of one of the bottles X and the other the neck thereof. The bottle carrier 32 moves the washed bottles X through a rinsing water Z in the compartment 17 and thereafter the rinsing water is drained therefrom in the same manner in which the cleansing fluid Y is drained from said bottles.

Before the bottles X in the bottle carrier 32 have made a complete rotation in the rinsing compartment 17 from the transfer device 38, the bottles X on said carrier successively engage a second transfer device 40, on the left hand partition 15 and identical with the transfer device 38, and are moved laterally thereby through a passageway 41 in the left hand partition 15 and into the pockets 35 in the bottle carrier 33 in the combined drying and sterilizing compartment 18.

After the bottles X on the bottle carrier 33 have made substantially a complete rotation in the combined drying and sterilizing compartment 18, from the transfer device 40, they engage a third transfer device 42 and are moved laterally thereby through a passageway 43 in the left side of the casing 12 and into a cylindrical chute 44. The transfer device 42 is also identical with the transfer device 38 and is secured to the left side of the casing 12. By the chute 44, which is outside of the casing 12 and on the left side thereof, the bottles X are conveyed by gravity to a distant point, see Figs. 1 and 4. Deep transverse notches 34′ are formed in the partitions 34 to afford clearance for the fingers comprising the transfer devices 38, 40 and 42.

It will thus be seen that bottles successively placed in the apparatus through the passageway 37 are automatically carried first through the washing process, second, a rinsing process, third, a sterilizing and drying process and finally discharged from said apparatus.

Cooperating with the ratchet wheel 30 to impart steps of rotary movement to the bottle carriers, which successively bring the pockets 35 in the bottle carrier 31 into alignment with the entrance passageway 37, is a spring-projected dog 45. This dog 45 is carried by the right hand arm of a manually operated transverse handle bar 46. Both arms of the handle bar 46 are pivoted on the outer ends of the shaft 21 just inward of the nuts 23. The arrangement of the ratchet wheel 30 and cooperating dog 45 is such that said dog during the down stroke of the handle bar 46 will impart a step of rotary movement of the bottle carrier in the direction of the arrow marked in Fig. 4, and during the up stroke of said bar the dog 45 will ride over the ratchet wheel 30.

The cleansing fluid Y is contained in the reservoir 19 and supplied to the compartment 16 through a port 47 in the right side of the casing 12 at the bottom thereof. The cleansing fluid Y in the compartment 16 and reservoir 19 is prevented from going above a predetermined level by an overflow pipe 48 which extends upward into the reservoir 19 through the bottom thereof and leads to a suitable point of disposal, see Figs. 3 and 5.

After the bottles X have been washed by the cleansing fluid Y and drained they are sprayed by a spraying system both externally and internally with the same fluid while in the compartment 16. This spraying system includes a double-acting pump 49 mounted on the frame 13 under the casing 12, see Fig. 1, and includes an upright cylinder and cooperating piston the rod of which extends upward through a stuffing box in the upper head of said cylinder and is connected by a long link 50 to the left hand arm of the handle bar 46 and by which handle bar the pump is reciprocated. The fluid intake for the pump 49 includes a pipe 51 the intake end of which is covered by a strainer 52 in the reservoir 19 and leads from the bottom of said reservoir, see Fig. 5. This pipe 51 is connected by a pair of branch pipes 53 to the heads of the pump cylinder on opposite sides of the piston and each having a check valve 54.

The external spraying of the bottles X in the washing compartment 16 is performed by a nozzle 55 mounted in the top of the casing 12 on the upwardly moving side of the bottle carrier 31 and connected by a long pipe 56 to the pump cylinder through the lower head thereof, see Fig. 1. This nozzle 55 successively sprays the bottles X as they pass thereunder at the upwardly moving side of the bottle carrier 31 and at which time they are inclined in respect to the jets of cleansing fluid discharged from said nozzle and thereby efficiently externally cleansed.

The internal spraying of the bottles X starts prior to the external spraying thereof and continues thereafter and is performed by a nozzle 57 for each bottle in the bottle carrier 31, see Fig. 10. The nozzles 57 are mounted in the rim of the bottle carrier 31 and connected to the pump 49 by a pipe 58 which leads from the pump cylinder through its upper head, is tapped into the right hand end of the fixed shaft 21 and has communication with an axial conduit 59 in said shaft. Formed in the shaft 21 at the inner end of the conduit 59 is a radially extended circumferentially flaring port 60. Each tubular spoke in the bottle carrier 31 affords a conduit 61 which extends radially through the respective ring valve 26, see Fig. 7. These conduits 61 which connect the nozzle 57 to the port 60 are closed by the respective valve seat 25 except when passing the port 60 during the rotation of the ring valve of the bottle carrier 31. It will thus be seen that the bottles X are internally sprayed during the period of time in which the conduits 57 are in registration with the port 60. The external and internal spraying of the bottles X in the bottle carrier 31 is completed by the time said bottles reach their uppermost positions in the compartment 16 and from this position until they engage the transfer device 38 the cleansing fluid Y is drained therefrom. All cleansing fluid Y discharged from the nozzles 55 and 57 is returned to the body of said fluid in the compartment 16.

The rinsing water Z is supplied to the compartment 17 at the bottom thereof through a pipe 62 leading from a suitable source of supply, not shown, and which pipe is normally closed by a valve 63.

The washed bottles X upon entering the rinsing compartment 17 are moved by the bottle carrier 32 through the rinsing water Z and thereabove where they are drained in a manner similar to the draining of the washed bottles X in the compartment 17. After the draining of the rinsed bottles X they are sterilized by introducing dry steam therein through nozzles 64 mounted in the rim of the bottle carrier 32 in the same manner in which the nozzles 57 are mounted in the rim of the bottle carrier 31. Steam for sterilizing the bottles X is conveyed from a suitable source of supply, not shown, through a pipe 65 tapped into the left hand end of the fixed shaft 21 and in communication with an axial conduit 66 in said shaft. At the inner end of the conduit 66 is a port 67 of the same shape and arrangement as the port 60. From the port 67 steam is conveyed to the nozzles 64 through conduits 68 in the ring valve 26 and spokes of the bottle carrier 32. These conduits 68 are closed by the seat for the respective ring valve 26 except when passing the port 67 during the rotation of the bottle carrier 32. The steam is cut off from the conduits 68 by the respective ring valve 26 after passing substantially the highest point of travel of the bottles X in the rinsing compartment 17 and thereafter any moisture, due to condensation, is drained from the bottles X before reaching the transfer device 40. A valve 69 is provided for closing the steam pipe 65 near its attachment to the shaft 21.

The rinsed and sterilized bottles are dried and further sterilized in the compartment 18 to which they are moved from the compartment 17 by the transfer device 40. Dry steam is introduced into the bottles X from the conduit 66 through a port 70, in the shaft 21 and conduits 71 in the spokes of the bottle carrier 33 and respective ring valve 26, and which conduits are brought into registration with the port 70 during the rotation of said ring valve. The port 70 has a much larger steam-conducting capacity than either of the ports 60 and 69, and hence, the bottles X in the compartment 18 have a longer period of sterilization than in the compartment 17.

The compartments 16, 17 and 18 may be individually drained through branch pipes 72 connected to a main drain pipe 73 leading to a suitable point of disposal. Each branch pipe 72 is provided with a normally closed valve 73'.

To individually cleanse and sterilize the drained compartments 16, 17 and 18 and the bottle carriers therein, branch steam pipes 75 lead from a steam pipe 65 and are connected one to each of the branch drain pipes 72 at the intake side of their valves 74. Each branch steam pipe 75 is provided with a normally closed valve 76.

What I claim is:

1. An apparatus of the class described comprising a casing, a revoluble hub mounted in the casing to turn about a horizontal axis, circumferentially spaced bottle pocket forming partitions on the hub, each of which is a flat U-shaped member that extends transversely of the hub, the legs of the partitions at their free end portions being secured to the hub at the periphery thereof with the body of the partition extending radially therefrom, means for cleansing the bottles in the pockets, and a bottle deflector fixed in respect to the casing and extending into said casing transversely of the partitions, said partitions having transverse notches to afford clearance for the deflecting fingers during the rotation of the hub.

2. The structure defined in claim 1 in which the legs of each partition are in converging relation and in which the sides of each pocket are substantially parallel.

In testimony whereof I affix my signature.

ALFRED J. DAVIS.